(12) United States Patent
Binhussain et al.

(10) Patent No.: US 10,487,005 B2
(45) Date of Patent: Nov. 26, 2019

(54) POROUS GLASS CERAMIC COMPOSITION AND METHOD FOR MANUFACTURING THE SAME

(71) Applicants: King Abdul Aziz City for Science and Technology, Riyadh (SA); Università di Padova, Padua (IT)

(72) Inventors: Mohammed A Binhussain, Riyadh (SA); Paolo Colombo, Padua (IT); Enrico Bernardo, Padua (IT); Majed A Binmajed, Riyadh (SA); Mauro Marangoni, Padua (IT); Hamad H Atalasi, Riyadh (SA); Amer M Alajmi, Riyadh (SA); Abdulaziz Altamimi, Riyadh (SA)

(73) Assignees: KING ABDUL AZIZ CITY FOR SCIENCE AND TECHNOLOGY (KACST), Riyadh (SA); UNIVERSITA DI PADOVA, Padua (IT)

(*) Notice: Subject to any disclaimer, the term of this patent is extended or adjusted under 35 U.S.C. 154(b) by 0 days.

(21) Appl. No.: 14/622,673

(22) Filed: Feb. 13, 2015

(65) Prior Publication Data

US 2015/0158760 A1    Jun. 11, 2015

Related U.S. Application Data

(62) Division of application No. 13/726,034, filed on Dec. 22, 2012, now abandoned.

(51) Int. Cl.
C03C 10/00 (2006.01)
C03C 14/00 (2006.01)
(Continued)

(52) U.S. Cl.
CPC .......... *C03C 10/0063* (2013.01); *B28B 1/004* (2013.01); *C03C 1/002* (2013.01);
(Continued)

(58) Field of Classification Search
CPC ......... C03C 10/0063; C04B 7/14; C04B 7/24; C04B 7/26; C04B 7/28; C04B 18/00; C04B 18/04; C04B 18/049; C04B 18/0481; C04B 18/06; C04B 18/08; C04B 33/132; C04B 33/135
See application file for complete search history.

(56) References Cited

U.S. PATENT DOCUMENTS

2,062,514 A * 12/1936 Hoof ................. H01T 13/38
174/152 S
3,700,472 A * 10/1972 Tauber ................ C04B 33/02
264/624
(Continued)

*Primary Examiner* — Angela Ortiz
*Assistant Examiner* — Russell Kemmerle, III
(74) *Attorney, Agent, or Firm* — Steven M. Shape; Dennemeyer & Associates, LLC (57) ABSTRACT

The invention provides a porous glass ceramic composition manufactured using conventional raw materials and one or more waste materials, wherein the waste materials are capable of producing glass forming oxides, glass modifying oxides and pore forming oxides. The waste materials are selected from a group that includes cullet, pozzolanic waste and fly ash. The invention also provides a method for manufacturing the porous glass ceramic composition.

18 Claims, 7 Drawing Sheets

(51) Int. Cl.
*C03C 27/00* (2006.01)
*C03C 27/02* (2006.01)
*C03C 1/00* (2006.01)
*C03C 11/00* (2006.01)
*B28B 1/00* (2006.01)

(52) U.S. Cl.
CPC .............. *C03C 11/00* (2013.01); *C03C 14/00* (2013.01); *C03C 14/006* (2013.01); *C03C 27/00* (2013.01); *C03C 27/02* (2013.01); *C03C 2204/00* (2013.01); *C03C 2214/14* (2013.01); *C03C 2214/20* (2013.01)

(56) References Cited

U.S. PATENT DOCUMENTS

| | | | |
|---|---|---|---|
| 7,524,452 B2* | 4/2009 | Amritphale | C04B 33/1322 264/667 |
| 8,641,961 B2* | 2/2014 | Hamamchyan | C04B 26/28 264/638 |
| 8,959,954 B2* | 2/2015 | Koseski et al. | C03C 1/002 65/33.1 |
| 2014/0174126 A1* | 6/2014 | Binhussain | C03C 1/002 65/21.5 |
| 2014/0179509 A1* | 6/2014 | Binhussain | C03C 1/002 501/32 |
| 2014/0243182 A1* | 8/2014 | Binhussain | C03C 10/0036 501/32 |
| 2015/0016895 A1* | 1/2015 | Abdullah et al. | E02D 3/00 405/263 |

\* cited by examiner

POROUS GLASS CERAMIC COMPOSITION AND METHOD FOR MANUFACTURING THE SAME

FIELD OF THE INVENTION

The invention generally relates to a porous glass ceramic composition and a method for manufacturing the porous glass ceramic composition. More specifically, the invention relates to a porous glass ceramic composition manufactured using natural raw materials and waste-derived glass.

BACKGROUND OF THE INVENTION

Porous glass ceramics are widely used for various applications such as heat and acoustic insulation and building facade materials. The porous glass ceramics are mainly used for manufacturing tiles due to its properties such as, but not limited to, hardness, mechanical strength, durability and insulation.

Generally, glass ceramics are produced using a two steps process. In first step, a glass is produced by a glass manufacturing process using different types of raw materials. During the second step, the glass is melted and cast into a mold or shaped using any techniques known to those ordinarily skilled in the art. The molten glass is cooled down and thereafter reheated to partly crystallize the glass during the second step. For preparing the porous glass ceramics, the molten glass is foamed with gas generated in situ. Alternatively, foaming agents or pore-forming agents such as, but not limited to, silicon carbide (SiC) particles and carbon particles are used to generate pores in the glass ceramics.

An alternative method for manufacturing glass ceramics includes sintering and crystallizing glass particles of suitable composition. Waste-derived glass can also be used as a raw material for preparing the porous glass ceramics. However, the foaming of waste-derived glasses is complicated due to tendency of the glass being crystallized on heating. Extensive crystallization of the glass on heating leads to problems in homogeneity and reproducibility of an overall foam morphology. Sintering temperature needs to be adjusted well above crystallization temperature and high heating rates are required to force the glass to sinter before extensive crystallization. The high heating rates required to force the glass to sinter before extensive crystallization consumes high amount of energy. Moreover, the composition of glass used as a starting material needs to be accurately engineered in order to control crystallization tendency of the glass such that surface crystallization and bulk crystallization is balanced. Further, the porous glass ceramics produced using the conventional method exhibit only few desired mechanical and chemical properties.

Additionally, industrial wastes such as pozzolanic wastes, fly ash, cullet, etc are immobilized by disposal in land-fills or immobilized in cement industries. Handling and disposal of such industrial wastes may require additional cost and is also hazardous to the environment.

Therefore, there is a need to develop a method for manufacturing porous glass ceramics which is environment friendly, cost effective and has superior mechanical and chemical properties.

BRIEF DESCRIPTION OF THE FIGURE

The accompanying figure together with the detailed description below forms part of the specification and serves to further illustrate various embodiments and to explain various principles and advantages all in accordance with the present invention.

DETAILED DESCRIPTION OF THE INVENTION

Before describing in detail embodiments that are in accordance with the invention, it should be observed that the embodiments reside primarily for a porous glass ceramic composition and in method steps related to manufacturing the porous glass ceramic composition.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article or composition that comprises a list of elements does not include only those elements but may include other elements not expressly listed or inherent to such process, method, article or composition. An element proceeded by "comprises . . . a" does not, without more constraints, preclude the existence of additional identical elements in the process, method, article or composition that comprises the element.

Generally speaking, pursuant to various embodiments, the invention provides a porous glass ceramic composition and a method for manufacturing the porous glass ceramic composition. The porous glass ceramic composition is manufactured using conventional raw material and one or more waste materials. The waste materials which are capable of producing glass forming oxides, glass modifying oxides and pore forming oxides are chosen. The waste materials are selected from a group that includes cullet, pozzolanic waste and fly ash.

Figure 1:
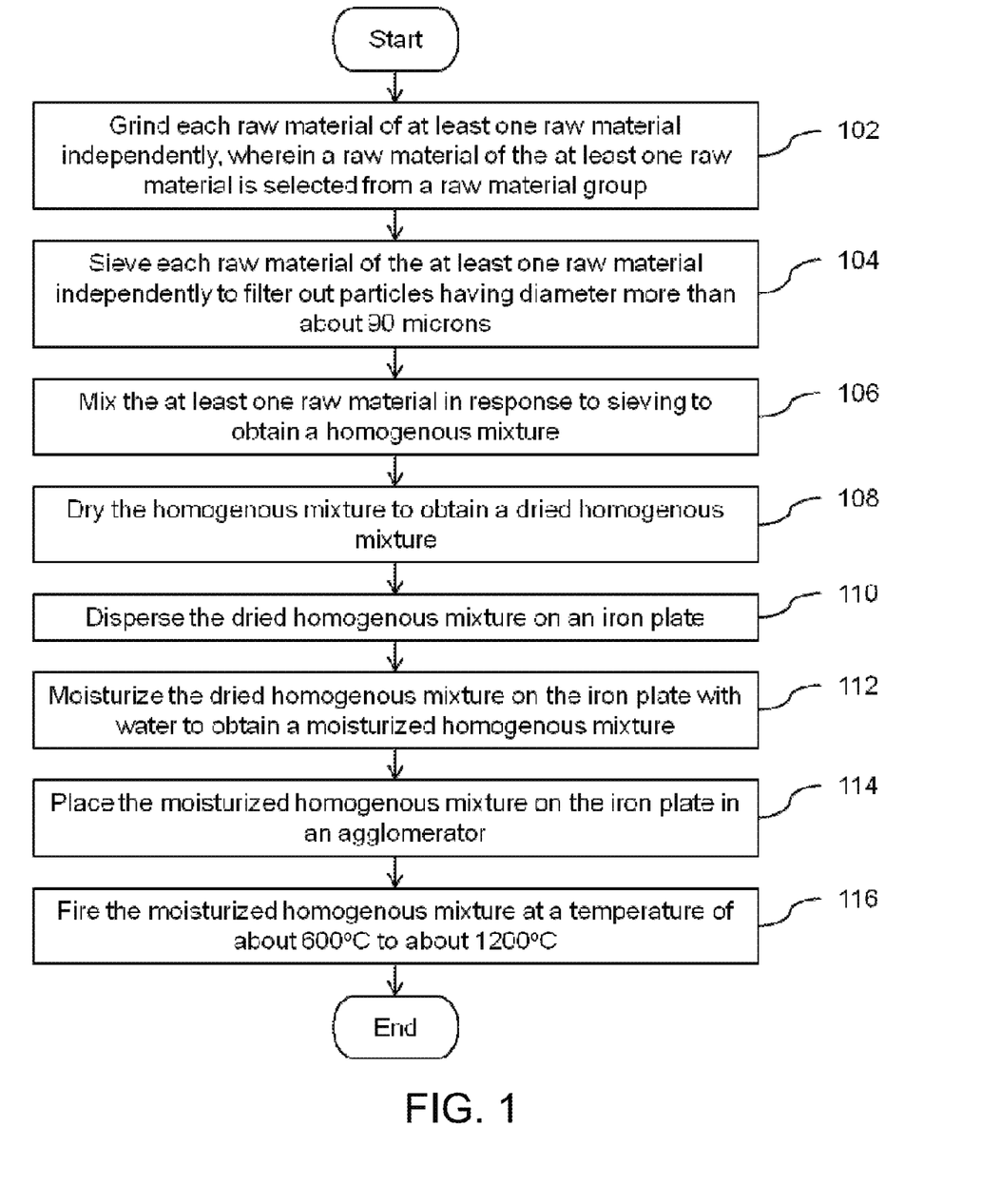
FIG. 1 illustrates a flow diagram of a method for manufacturing a porous glass ceramic composition in accordance with an embodiment of the invention.

FIG. 1 illustrates a flow diagram of a method for manufacturing a light weight porous glass ceramic composition in accordance with an embodiment of the invention.

One or more raw materials are used to manufacture the light weight porous glass ceramic composition. The one or more raw materials are selected based on a desired composition of the light weight porous glass ceramics. The one or more raw materials are selected from a raw material group which includes conventional raw materials used to manufacture light weight porous glass ceramics and one or more waste materials. The waste materials which are capable of producing glass forming oxides, glass modifying oxides and pore forming oxides are chosen. The glass forming oxides may include, but not limited to, silicon dioxide ($SiO_2$), boron trioxide ($B_2O_3$) and phosphorus pentoxide ($P_2O_5$). The glass modifying oxides may include, but not limited to, sodium oxide ($Na_2O$), potassium oxide ($K_2O$), calcium oxide (CaO) and magnesium oxide (MgO). The pore forming oxide may include, but not limited to, ferric oxide ($Fe_2O_3$). Other oxides such as, but not limited to, aluminum oxide ($Al_2O_3$), titanium dioxide ($TiO_2$), zirconium dioxide ($ZrO_2$) and manganese dioxide ($MnO_2$) can also be produced in various degrees in final formulation of the light weight porous glass ceramics. The conventional raw materials include white sand and clay. The waste materials are selected from a group that includes cullet, pozzolanic waste and fly ash. The waste materials are selected in such a way that the selected waste materials provide high amount of crystallize phases in the final formulation of the porous glass ceramic composition and increases porosity of the light weight porous glass ceramic composition. The raw materials for manufacturing the light weight porous glass ceramic are selected such that the pore forming oxides are high in the raw materials.

The porosity of the glass ceramic can be contributed in various other sources. Cullet is selected as a raw material so that gas evolution occurs during heating of the raw materials. Cullet generally includes a mixture of sheet glasses, recycled bottles and cathode ray tube glass. Further, water adsorbed on surface of particles of the raw materials during grinding steps also becomes a source of porosity if the raw materials are treated with a rapid heating rate. When the heating rate is higher than rate of desorption of gas, particles of raw materials soften and entrap the gas within the glass ceramic formed. This entrapping of the gas leads to spontaneous pore formation in the glass ceramic formed. Further, bubble-free glasses may also be present in the raw materials and formation of bubbles in bubble-free glasses at high temperature also contributes to porosity. The process of evolution of gas from the bubble-free glasses during reheating is called a reboil effect, which occurs due to decrease in solubility of dissolved gases at high temperature. Additionally, foaming agents or pore-forming agents such as, but not limited to, silicon carbide (SiC) particles and carbon particles can be used to generate pores in the glass ceramics.

At step 102, each raw material of one or more raw materials selected from the raw material group is ground independently. Any suitable grinding machine such as, but not limited to, a roll crusher, a ball mill or an impeller breaker can be used for grinding each raw material and as such those techniques would be apparent to those ordinarily skilled in the art. In an embodiment, each raw material of one or more raw materials selected from the raw material group is ground in a ball mill with a speed of about 400 revolutions per minute for a period of 30 minutes.

At step 104, each raw material of one or more raw materials selected from the raw material group is sieved independently to filter out particles of diameter more than about 90μ. The processing characteristics are optimized due to the use of particles of sizes of less than 90μ.

At step 106, the one or more raw materials with particles of sizes less than 90μ are mixed to obtain a homogenous mixture. In an embodiment, the one or more raw materials with particles of sizes less than 90μ are mixed in a ball mill with a speed of about 300 revolutions per minute for a period of about 30 minutes to obtain a homogenous mixture.

In an embodiment, the one or more raw materials includes about 15 wt % to about 70 wt % of pozzolanic waste, about 30 wt % to about 100 wt % of cullet and about 0 wt % to about 15 wt % of clay.

In another embodiment, the one or more raw materials includes about 30 wt % to about 70 wt % of pozzolanic wastes, about 0 wt % to about 20 wt % of white sand, about 0 wt % to about 30 wt % of clay, about 10 wt % to about 90 wt % of cullet and about 0 wt % to about 30 wt % of fly ash.

In yet another embodiment, the raw materials may includes cullet powder, or powder of a glass produced from waste materials, or mixture of the cullet powder and the powder of the glass produced from waste in variable ratio.

In yet another embodiment, the cullet and the pozzolanic waste are in a weight ratio of about 15:70 to about 65:30 in the homogenous mixture.

At step 108, the homogenous mixture is allowed to dry to obtain a dried homogenous mixture. For example, the homogenous mixture can be dried at a temperature of about 80° C. in an oven for period of about 8 hours to about 10 hours.

At step 210, the dried homogenous mixture is dispersed on an iron plate. The iron plate may be a broad surface iron plate to make the dispersion of the dried homogenous mixture easy.

At step 112, the dried homogeneous mixture on the iron plate is moisturized with water to obtain a moisturized homogenous mixture. For example, the dried homogeneous mixture on the iron plate is moisturized by spraying water using a spray nozzle.

At step 114, the moisturized homogenous mixture is placed in an agglomerator. The agglomerator employs variety of techniques to induce collisions among particles in a mixture. The agglomerator used in step 214 can be one of, but not limited to, rotating plates, rotating drums, vibrating membrane and vibrating plates. Alternatively, the moisturized homogenous mixture can be placed in a pelletizer. Any other suitable type of technique for agglomerating or pelletizing can be used at step 214 and as such the techniques which can be used would be apparent to those ordinarily skilled in the art. Further, clusters of particles are formed due to collision among the particles in the moisturized homogenous mixture. When the clusters of particles reach about 0.5 mm to about 5 mm in size, the moisturized homogenous mixture is placed on a refractory for firing. Any other cluster sizes suitable for further step of firing can also be used.

At step 116, the moisturized homogenous mixture is fired at a temperature of about 600° C. to about 1200° C. In accordance with the embodiment, the moisturized homogenous mixture is fired at a temperature of about 600° C. to about 1200° C. for a period of about 5 minutes to about 60 minutes. In accordance with the embodiment, the moisturized homogenous mixture is fired at a temperature of about 600° C. to about 1200° C. with a rate of about 40° C. per minute to about 120° C. per minute for a period of about 12 minutes to about 1 hour 30 minutes.

Figure 2:
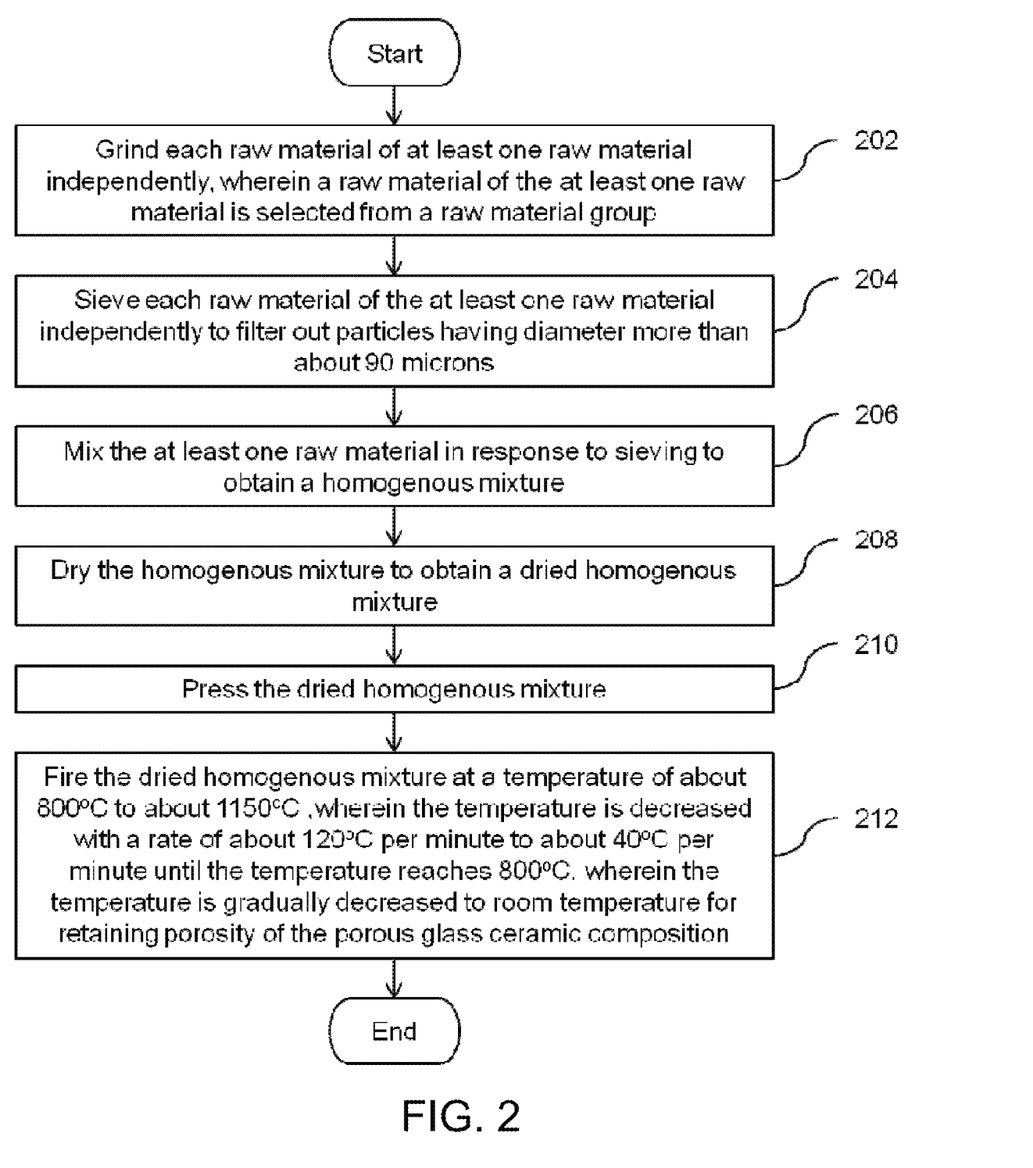
FIG. 2 illustrates a flow diagram of a method for manufacturing a light weight porous glass ceramic composition in accordance with an embodiment of the invention.

FIG. 2 illustrates a flow diagram of a method for manufacturing a porous glass ceramic composition in accordance with an embodiment of the invention.

One or more raw materials are used to manufacture the porous glass ceramic composition. The one or more raw materials are selected based on a desired composition of the porous glass ceramics. The one or more raw materials are selected from a raw material group which includes conventional raw materials used to manufacture porous glass ceramics and one or more waste materials. The waste materials which are capable of producing glass forming oxides, glass modifying oxides and pore forming oxides are chosen. The glass forming oxides may include, but not limited to, silicon dioxide ($SiO_2$), boron trioxide ($B_2O_3$) and phosphorus pentoxide ($P_2O_5$). The glass modifying oxides may include, but not limited to, sodium oxide ($Na_2O$), potassium oxide ($K_2O$), calcium oxide (CaO) and magnesium oxide (MgO). The pore forming oxide may include, but not limited to, ferric oxide ($Fe_2O_3$). Other oxides such as, but not limited to, aluminum oxide ($Al_2O_3$), titanium dioxide ($TiO_2$), zirconium dioxide ($ZrO_2$) and manganese dioxide ($MnO_2$) can also be produced in various degrees in final formulation of the porous glass ceramics. The conventional raw materials include white sand and clay. The waste materials are selected from a group that includes cullet, pozzolanic waste and fly ash. The waste materials are selected in such a way that the selected waste materials provide high amount of crystallize phases in the final formulation of the porous glass ceramic composition and increases porosity of the porous glass ceramic composition. Cullet, glass waste from recycling plants, is very beneficial as use of cullet decreases time and temperature required during the manufacturing process of the porous glass ceramics.

The raw materials for manufacturing the porous glass ceramic are selected such that the pore forming oxides are high in the raw materials. For example, due to high amount of ferric oxide, the porosity of the porous glass ceramic increases. A change in an oxidation state from $Fe_2O_3$ to FeO ($Fe^{3+}$ to $Fe^{2+}$), which occurs at high temperatures, leads to release of oxygen gas. The oxygen gas is embedded within a glass matrix providing the spontaneous formation of pores. A possibility of successfully producing porous glass ceramic form is related to interplay between gas generation and glass viscosity at a given temperature. The glass viscosity needs to be as low as to enable expansion but as high as to avoid gas escape from a molten glass.

The porosity of the glass ceramic can be contributed in various other sources. Cullet is selected as a raw material so that gas evolution occurs during heating of the raw materials. Cullet generally includes a mixture of sheet glasses, recycled bottles and cathode ray tube glass. Further, water adsorbed on surface of particles of the raw materials during grinding steps also becomes a source of porosity if the raw materials are treated with a rapid heating rate. When the heating rate is higher than rate of desorption of gas, particles of raw materials soften and entrap the gas within the glass ceramic formed. This entrapping of the gas leads to spontaneous pore formation in the glass ceramic formed. Further, bubble-free glasses may also be present in the raw materials and formation of bubbles in bubble-free glasses at high temperature also contributes to porosity. The process of evolution of gas from the bubble-free glasses during reheating is called a reboil effect, which occurs due to decrease in solubility of dissolved gases at high temperature. Additionally, foaming agents or pore-forming agents such as, but not limited to, silicon carbide (SiC) particles and carbon particles can be used to generate pores in the glass ceramics.

At step 202, each raw material of one or more raw materials selected from the raw material group is ground independently. Any suitable grinding machine such as, but not limited to, a roll crusher, a ball mill or an impeller breaker can be used for grinding each raw material and as such those techniques would be apparent to those ordinarily skilled in the art. In an embodiment, each raw material of one or more raw materials selected from the raw material group is ground in a ball mill with a speed of about 400 revolutions per minute for a period of 30 minutes.

At step 204, each raw material of one or more raw materials selected from the raw material group is sieved independently to filter out particles of diameter more than about 90 microns (μ). The processing characteristics are optimized due to the use of particles of sizes of less than 90μ.

At step 206, the one or more raw materials with particles of sizes of less than 90μ are mixed to obtain a homogenous mixture. In an embodiment, the one or more raw materials with particles of sizes of less than 90μ are mixed in a ball mill with a speed of about 300 revolutions per minute for a period of about 30 minutes to obtain a homogenous mixture.

In an embodiment, the one or more raw materials includes about 15 wt % to about 70 wt % of pozzolanic waste, about 30 wt % to about 100 wt % of cullet and about 0 wt % to about 15 wt % of clay.

In another embodiment, the one or more raw materials includes about 30 weight percent (wt %) to about 70 wt % of pozzolanic wastes, about 0 wt % to about 20 wt % of white sand, about 0 wt % to about 30 wt % of clay, about 10 wt % to about 100 wt % of cullet and about 0 wt % to about 30 wt % of fly ash.

In yet another embodiment, the raw materials may includes cullet powder, or powder of a glass produced from waste materials, or mixture of the cullet powder and the powder of the glass produced from waste in variable ratio.

In yet another embodiment, the cullet and the pozzolanic waste are in a weight ratio of about 15:70 to about 65:30 in the homogenous mixture.

At step 208, the homogenous mixture is allowed to dry. For example, the homogenous mixture can be dried at a temperature of about 80° C. in an oven for period of about 8 hours to about 10 hours.

At step 210, the dried homogenous mixture is pressed. In an embodiment, the dried homogenous mixture is pressed using one of uniaxial cold pressing, biaxial cold pressing, dry pressing, semi-dry pressing, compacting, cold isostatic pressing, hot pressing, extrusion molding, injection molding, compression molding, gel casting, slip casting and tape casting. Any other suitable type of technique for pressing can be used at step 110 and as such the techniques which can be used would be apparent to those ordinarily skilled in the art. For example, the dried homogenous mixture is uniaxially cold pressed at a pressure of about 10 Megapascal (MPa) to about 40 MPa in a mold.

At step 212, the dried homogenous mixture is fired at a temperature of about 800° C. to about 1150° C. In accordance with the embodiment, the dried homogenous mixture is fired at a temperature of about 800° C. to about 1150° C. for a period of about 5 minutes to about 60 minutes. In accordance with the embodiment, the dried homogenous mixture is fired at a temperature of about 800° C. to about 1150° C. with a rate of about 40° C. per minute to about 120° C. per minute for a period of about 12 minutes to about 1 hour 30 minutes. After the porous glass ceramic composition is formed, the temperature is decreased with a rate of about 120° C. per minute to about 40° C. per minute until the temperature reaches 800° C. to retain porosity of the porous glass ceramic composition. After the temperature of the porous glass ceramic composition is decreased till 800° C., the temperature is then gradually decreased to room temperature.

In various embodiments of the invention, the glass ceramic composition includes about 50 wt % to about 70 wt % of silicon dioxide ($SiO_2$), about 5 wt % to about 35 wt % of alumina ($Al_2O_3$), about 5 wt % to about 12 wt % of calcium oxide (CaO), about 5 wt % to about 20 wt % of sodium oxide ($Na_2O$), about 0.5 wt % to about 1.5 wt % of titanium dioxide ($TiO_2$), and about 2 wt % to about 10 wt % of ferric oxide ($Fe_2O_3$).

The porous glass ceramic composition is prepared using the conventional raw materials used to manufacture porous glass ceramics and one or more waste materials. The waste materials which are capable of producing glass forming oxides, glass modifying oxides and pore forming oxides are chosen. The glass forming oxides may include, but not limited to, silicon dioxide ($SiO_2$), boron trioxide ($B_2O_3$) and phosphorus pentoxide ($P_2O_5$). The glass modifying oxides may include, but not limited to, sodium oxide ($Na_2O$), potassium oxide ($K_2O$), calcium oxide (CaO) and magnesium oxide (MgO). The pore forming oxide may include, but not limited to, ferric oxide ($Fe_2O_3$). Other oxides such as, but not limited to, aluminum oxide ($Al_2O_3$), titanium dioxide ($TiO_2$), zirconium dioxide ($ZrO_2$) and manganese dioxide ($MnO_2$) can also be produced in various degrees in final formulation of the porous glass ceramics. The conventional raw material includes white sand and clay. The waste materials are selected from a group that includes cullet, pozzolanic waste and fly ash. The waste materials are selected in such a way that the selected waste materials provide high amount of crystallize phases in the final formulation of the porous glass ceramic composition and increases porosity of the porous glass ceramic composition. The raw materials for manufacturing the porous glass ceramic are selected such that the pore forming oxides are high in the raw materials.

In an embodiment, raw materials used to prepare the glass ceramic composition includes about 30 wt % to about 70 wt % of pozzolanic waste, about 0 wt % to about 20 wt % of white sand, about 0 wt % to about 30 wt % of clay, about 10 wt % to about 100 wt % of cullet and about 0 wt % to about 30 wt % of fly ash.

In another embodiment, raw materials used to prepare the glass ceramic composition includes about 15 wt % to about 70 wt % of pozzolanic waste, about 30 wt % to about 100 wt % of cullet and about 0 wt % to about 15 wt % of clay.

Working Example 1

Figure 3:
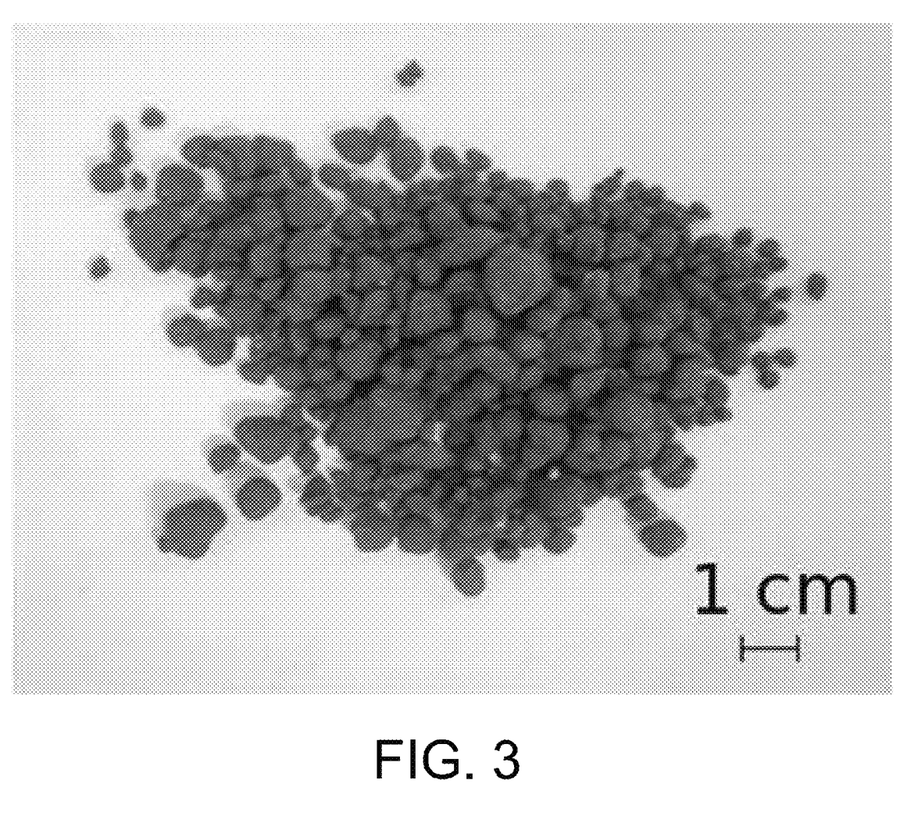
FIG. 3 illustrates spheroidal porous glass ceramic beads with broad particle sizes of range 1 millimeter (mm) to 8 mm.

30 grams (g) of pozzolanic waste, 15 g of clay, 15 g of fly ash and 40 g of cullet are raw materials ball milled independently for 30 minutes at 400 revolutions per minute. Each raw material is sieved independently to filter out particles of diameter more than about 90μ. The raw materials with the particle of sizes less than 90μ are mixed in a ball mill with a speed of about 300 revolutions per minute for a period of about 30 minutes to obtain a homogenous mixture. The homogenous mixture is dried at a temperature of about 80° C. in an oven overnight to obtain dried homogenous mixture. The dried homogenous mixture is dispersed on a broad surface of an iron plate. The dried homogeneous mixture on the iron plate is moisturized by spraying water using a spray nozzle to obtain a moisturized homogenous mixture. Further, the moisturized homogenous mixture is placed in an agglomerator to form agglomerates. When the agglomerates reach about 0.5 mm to about 5 mm in size, the agglomerates are placed on a refractory for firing. The agglomerates are fired at a temperature of 1050° C. for a period of 5 minutes with a rate of 120° C. per minute to obtain porous glass ceramic beads. FIG. 3 spheroidal porous glass ceramic beads with broad particle sizes of range 1 mm to 8 mm.

Working Example 2

40 g of pozzolanic waste, 10 g of clay and 50 g of cullet are raw materials ball milled independently with a speed of about 400 revolutions per minute for a period of 30 minutes. Each raw material is sieved independently to filter out particles of diameter more than about 90μ. The raw materials with the particle of sizes less than 90μ are mixed in a ball mill with a speed of about 300 revolutions per minute for a period of about 30 minutes to obtain a homogenous mixture. The homogenous mixture is dried at a temperature of about 80° C. in an oven overnight to obtain dried homogenous mixture. The dried homogenous mixture is uniaxially cold pressed at a pressure of about 10 MPa to about 40 MPa in a mold. The dried homogenous mixture in the mold after pressing is fired at a temperature of 1100° C. with a rate of 120° C. per minute for a period of about 15 minutes to about 60 minutes. After a porous glass ceramic is formed, the temperature is decreased with a rate of 50° C. per minute to 40° C. per minute until the temperature reaches 600° C. to retain porosity of the porous glass ceramic. The temperature is then slowly decreased to room temperature.

Figure 4:
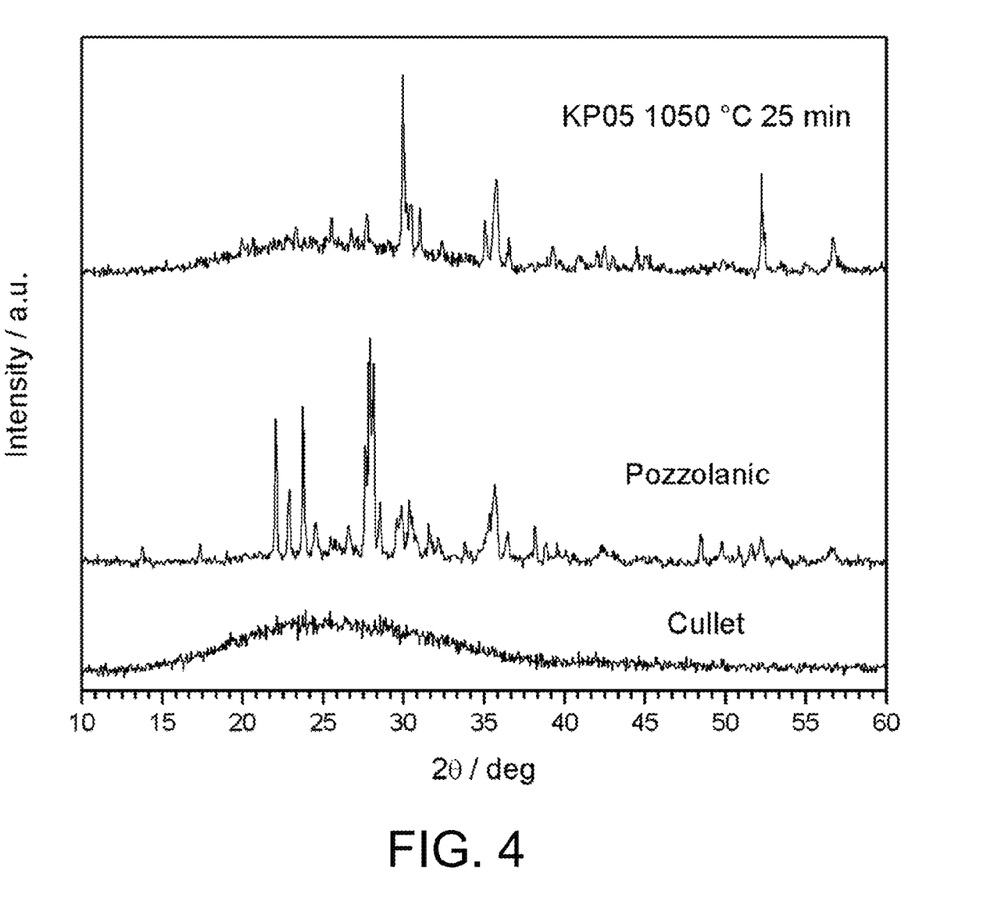
FIG. 4 illustrates X-ray diffraction patterns of cullet, pozzolanic waste and a foamed sample fired at a temperature of 1050° C. for a period of 25 minutes.
Figure 5:
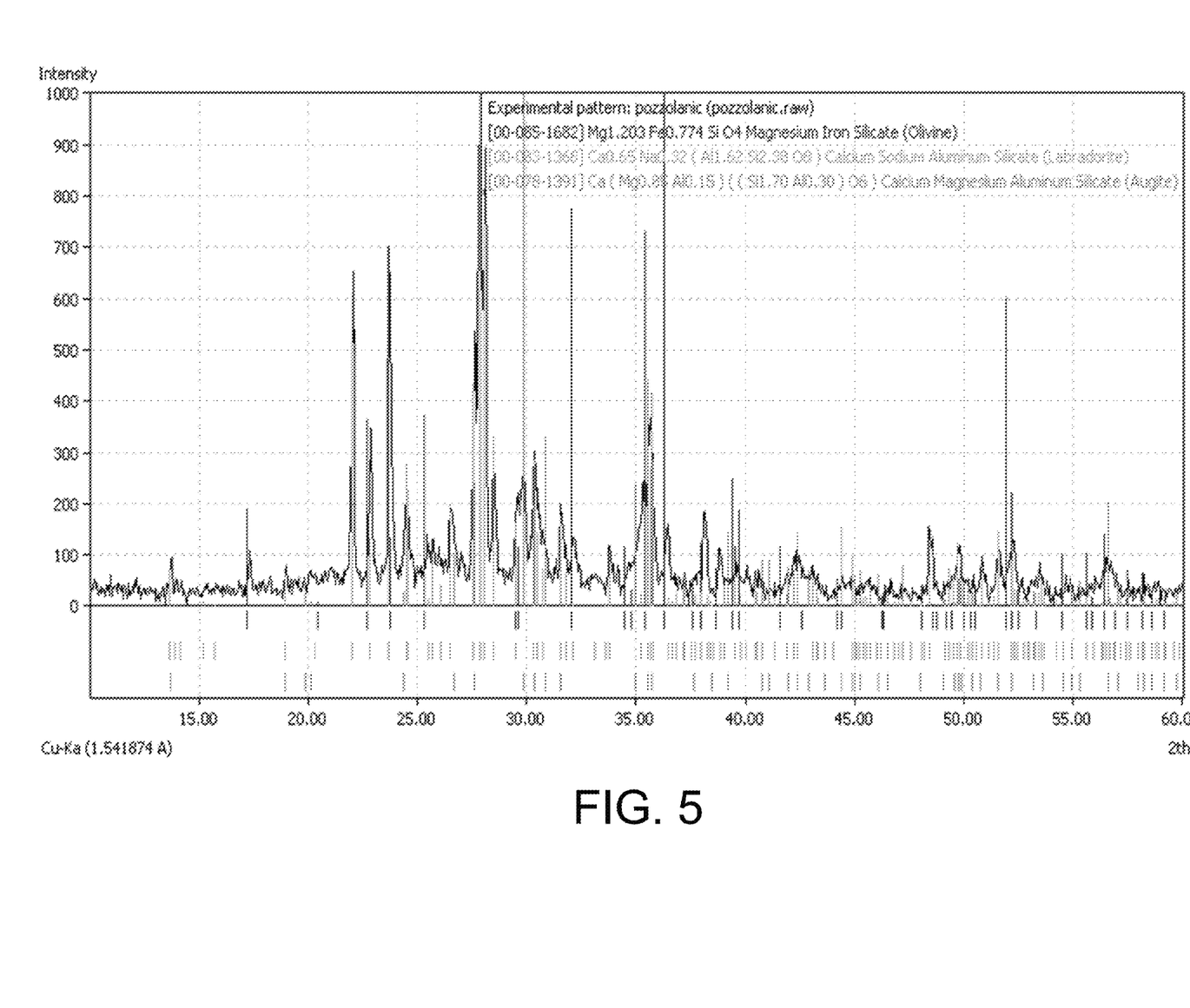
FIG. 5 illustrates X-ray diffraction patterns of the pozzolanic waste.
Figure 6:
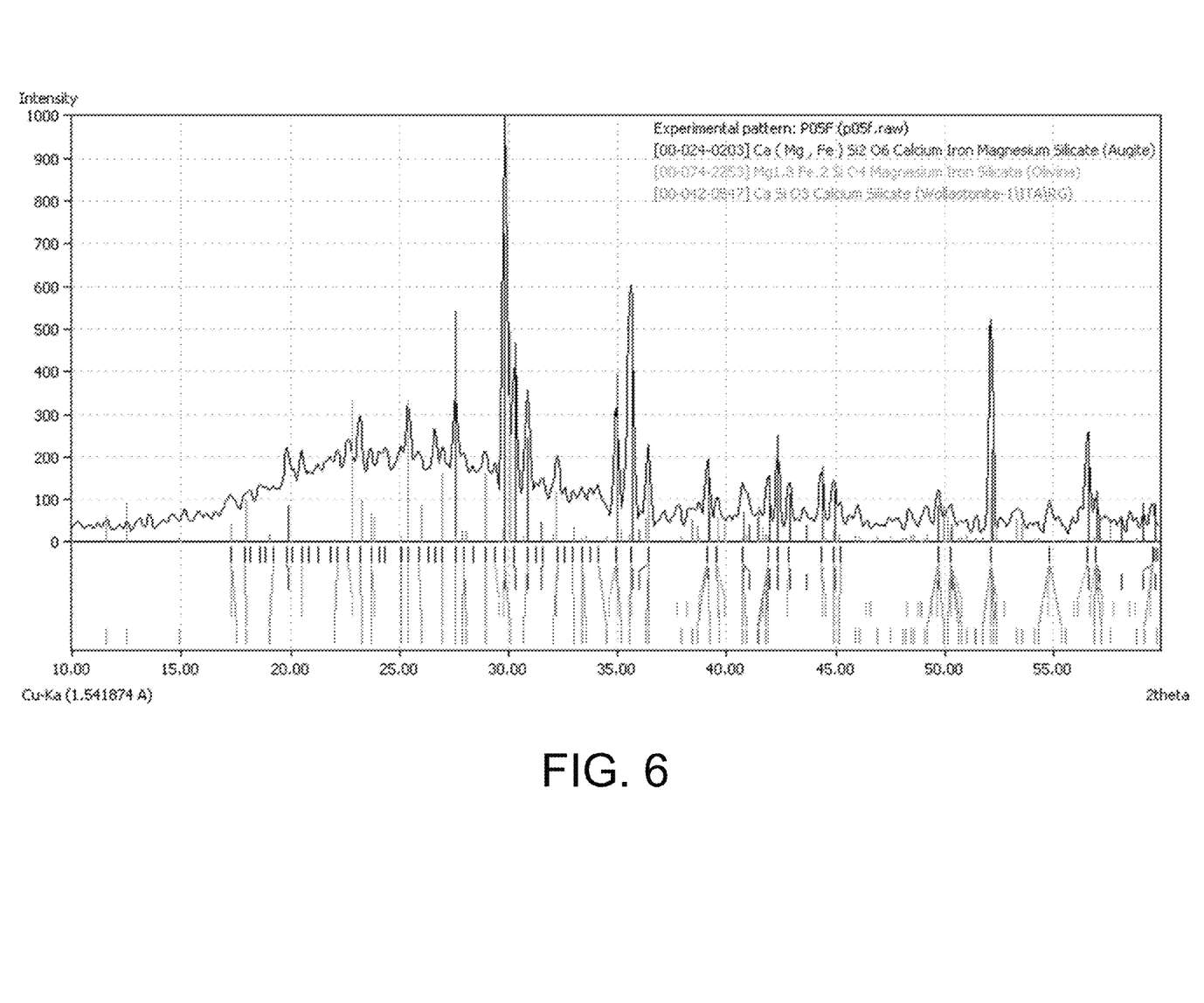
FIG. 6 illustrates X-ray diffraction patterns of a porous glass ceramic sample fired at a temperature of 1050° C. for a period of 25 minutes.

The porous glass ceramic composition obtained using various embodiments of the invention produces high amount of crystalline phases in CaO—$SiO_2$—$Al_2O_3$ system. FIG. 4 illustrates X-ray diffraction patterns of cullet, pozzolanic waste and a foamed sample fired at a temperature of 1050° C. for a period of 25 minutes. Cullet is completely amorphous whereas pozzolanic waste includes olivine (($Mg,Fe)_2SiO_4$), labradorite (($Ca,Na)(Si,Al)_4O_8$) and augite (($Ca,Na)(Mg,Fe)(Al,Si)_2O_6$). For a heat treatment at a temperature of 1050° C. for a period of 25 minutes, pozzolanic waste and cullet form a glass ceramic material based on an amorphous phase containing olivine and augite crystals. The labradorite disappears and wollastonite ($CaSiO3$) precipitates due to crystal phase evolution during the heat treatment. FIG. 5 illustrates X-ray diffraction patterns of the pozzolanic waste and FIG. 6 illustrate X-ray diffraction patterns of a porous glass ceramic sample fired at a temperature of 1050° C. for a period of 25 minutes.

The porous glass ceramic is obtained directly from reaction of different raw materials during the step of firing of various embodiments of the invention, but is not by conventional method of sintering of glass powder. Further, the pores are formed in the porous glass ceramic based on raw materials selected for the preparing the porous glass ceramic. Thus, there is no need of addition of any foaming agent or pore forming agent such as, but not limited to, silicon carbide (SiC) particles and carbon particles in the method of preparing porous glass ceramics in the invention.

Figure 7:
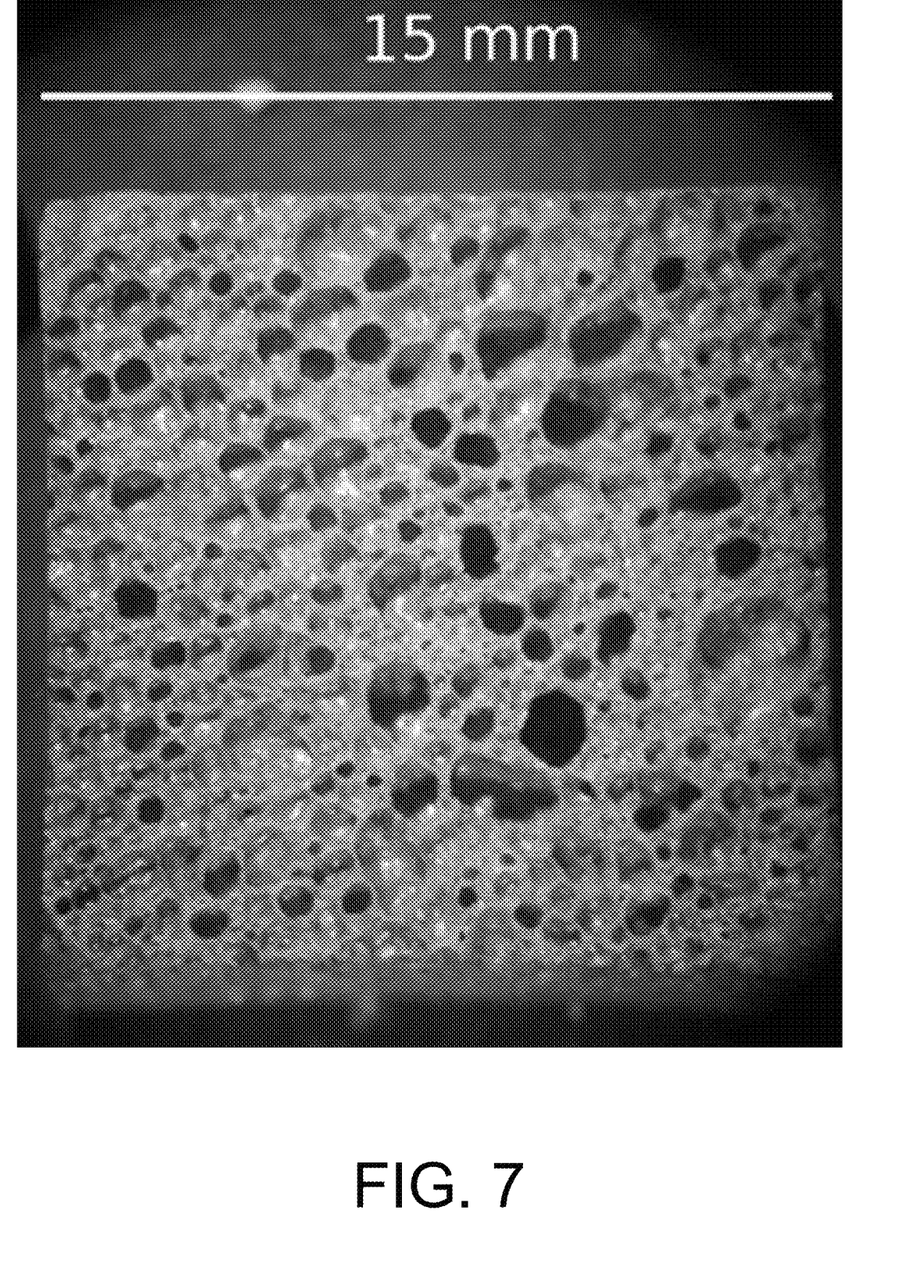
FIG. 7 illustrates a stereo-microscopic image of a section of a sample of a porous glass ceramic sample fired at a temperature of 1050° C. for a period of 25 minutes.

Various embodiments of the invention produce porous glass ceramic compositions with significantly improved properties. The characterization of the glass ceramic compositions of the invention shows that the porous glass ceramic products possess a geometrical density of 0.30 grams per cubic centimeter (g/cm$^3$) to 1.20 g/cm$^3$. The geometrical density of the porous glass ceramic compositions of the invention indicates that total porosity is 40 volume percent (vol %) to 90 vol %. FIG. 7 illustrates a stereo microscopic image of a section of a porous glass ceramic sample fired at a temperature of 1050° C. for a period of 25 minutes. The compression strength of the glass ceramic compositions of the invention is remarkably high with a value of 5 MPa to 40 MPa depending on the level of porosity, type of crystallites and amount of crystallites present in the porous glass ceramic.

Various embodiments of the invention provides an environment friendly porous glass ceramics as the various industrial waste materials and waste-derived glasses are used to manufacture the porous glass ceramics.

Those skilled in the art will realize that the above recognized advantages and other advantages described herein are merely exemplary and are not meant to be a complete rendering of all of the advantages of the various embodiments of the present invention.

In the foregoing specification, specific embodiments of the present invention have been described. However, one of ordinary skill in the art appreciates that various modifications and changes can be made without departing from the scope of the present invention as set forth in the claims below. Accordingly, the specification is to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The present invention is defined solely by the appended claims including any amendments made during the pendency of this application and all equivalents of those claims as issued.

What is claimed is:

1. A method for manufacturing a porous glass ceramic composition, the method comprising:
    grinding each raw material independently, wherein each raw material is selected from a raw material group comprising pozzolanic waste, cullet and clay, the pozzolanic waste comprising olivine $((Mg,Fe)_2SiO_4)$, labradorite $((Ca,Na)(Si,Al)_4O_8)$ and augite $((Ca,Na)(Mg,Fe)(Al,Si)_2O_6)$;
    sieving each raw material independently to filter out particles having diameter more than about 90 microns;
    mixing the raw materials in response to sieving to obtain a homogenous mixture comprising the pozzolanic waste, cullet and clay;
    drying the homogenous mixture to obtain a dried homogenous mixture;
    pressing the dried homogenous mixture;
    firing the dried homogenous mixture at a temperature of about 1150° C.;
    decreasing the temperature of the dried homogenous mixture at a rate of about 120° C. per minute to about 40° C. per minute until the temperature reaches 800° C. to retain porosity of the porous glass ceramic composition; and
    gradually decreasing the temperature of the dried homogenous mixture to room temperature.

2. The method of claim 1, wherein each raw material is ground in a ball mill with a speed of about 400 revolutions per minute for a period of 30 minutes.

3. The method of claim 1, wherein the at least one raw material is mixed in a ball mill with a speed of about 300 revolutions per minute for a period of about 30 minutes.

4. The method of claim 1, wherein the dried homogenous mixture is pressed using one of uniaxially cold pressing, biaxial cold pressing, dry pressing, semi-dry pressing, compacting, cold isostatic pressing, hot pressing, extrusion molding, injection molding, compression molding.

5. The method of claim 1, wherein the dried homogenous mixture is fired with a temperature of about 800° C. to about 1150° C. with a rate of about 40° C. per minute to about 120° C. per minute for a period of about 12 minutes to about 1 hour 30 minutes.

6. The method of claim 1, wherein the at least one raw materials comprises about 15 wt % to about 70 wt % of the pozzolanic waste, about 30 wt % to about 100 wt % of the cullet and about 0 wt % to about 15 wt % of the clay.

7. The method of claim 1, wherein the raw material group further comprises white sand and fly ash.

8. The method of claim 7, wherein the at least one raw materials comprises about 30 weight percent (wt %) to about 70 wt % of the pozzolanic wastes, about 0 wt % to about 20 wt % of white sand, about 0 wt % to about 30 wt % of the clay, about 10 wt % to about 100 wt % of the cullet and about 0 wt % to about 30 wt % of fly ash.

9. The method of claim 1, wherein the cullet and the pozzolanic waste are in a weight ratio of about 15:70 to about 65:30 in the homogenous mixture.

10. A method for manufacturing a light weight porous glass ceramic composition, the method comprising:
    grinding each raw material independently, wherein each raw material is selected from a raw material group comprising pozzolanic waste, cullet and clay, the pozzolanic waste comprising olivine $((Mg,Fe)_2SiO_4)$, labradorite $((Ca,Na)(Si,Al)_4O_8)$ and augite $((Ca,Na)(Mg,Fe)(Al,Si)_2O_6)$;
    sieving each raw material independently to filter out particles having diameter more than about 90 microns;
    mixing the raw materials in response to sieving to obtain a homogenous mixture comprising the pozzolanic waste, cullet and clay;
    drying the homogenous mixture to obtain a dried homogenous mixture;
    dispersing the dried homogenous mixture on an iron plate;
    moisturizing the dried homogenous mixture on the iron plate with water to obtain a moisturized homogenous mixture;
    placing the moisturized homogenous mixture on the iron plate in an agglomerator;
    firing the moisturized homogenous mixture at a temperature of about 1200° C.;
    decreasing the temperature of the fired homogenous mixture at a rate of about 120° C. per minute to about 40° C. per minute until the temperature reaches 600° C. to retain porosity of the porous glass ceramic composition; and
    gradually decreasing the temperature of the fired homogenous mixture to room temperature.

11. The method of claim 10, wherein each raw material of the at least one raw material is ground in a ball mill with a speed of about 400 revolutions per minute for a period of 30 minutes.

12. The method of claim 10, wherein the at least one raw material are mixed in a ball mill with a speed of about 300 revolutions per minute for a period of about 30 minutes.

13. The method of claim 10, wherein the homogenous mixture is pressed using one of uniaxially cold pressing, biaxial cold pressing, dry pressing, semi-dry pressing, compacting, cold isostatic pressing, hot pressing, extrusion molding, injection molding, and compression molding.

14. The method of claim 10, wherein the moisturized homogenous mixture is fired with a temperature of about 600° C. to about 1200° C. at a rate of about 40° C. per minute to about 120° C. per minute for a period of about 12 minutes to about 1 hour 30 minutes.

15. The method of claim 10, wherein the at least one raw material comprises about 15 wt % to about 70 wt % of the pozzolanic waste, about 30 wt % to about 100 wt % of the cullet and about 0 wt % to about 15 wt % of the clay.

16. The method of claim 10, wherein the raw material group further comprises white sand and fly ash.

17. The method of claim 16, wherein the at least one raw material comprises about 30 weight percent (wt %) to about 70 wt % of the pozzolanic wastes, about 0 wt % to about 20 wt % of white sand, about 0 wt % to about 30 wt % of the clay, about 10 wt % to about 100 wt % of the cullet and about 0 wt % to about 30 wt % of fly ash.

18. The method of claim 10, wherein the cullet and the pozzolanic waste are in a weight ratio of about 15:70 to about 65:30 in the homogenous mixture.

\* \* \* \* \*